United States Patent [19]

Clarkson

[11] Patent Number: 4,563,023

[45] Date of Patent: Jan. 7, 1986

[54] AMBULANCE SAFETY STABILIZER HARNESS FOR PARA-MEDICS

[76] Inventor: Larry E. Clarkson, 215 S. Main St., Nevada, Ohio 44849

[21] Appl. No.: 563,782

[22] Filed: Dec. 21, 1983

[51] Int. Cl.[4] .............................................. B60R 21/10
[52] U.S. Cl. ....................................... 280/748; 182/3; 244/122 B; 297/468
[58] Field of Search ...................... 280/748, 801, 808; 297/464, 468; 182/3; 244/122 R, 122 B

[56] References Cited

U.S. PATENT DOCUMENTS 4,251,100  2/1981  Rolandelli ............................ 280/801

FOREIGN PATENT DOCUMENTS 1216119  5/1962  Fed. Rep. of Germany ...... 280/808
696755  10/1965  Italy .................................... 297/468

Primary Examiner—Joseph F. Peters, Jr.
Assistant Examiner—Kenneth R. Rice

[57] ABSTRACT

This harness device provides safety support for paramedics within an emergency vehicle, while they are performing their duties with a patient. Primarily, the device includes a waist belt and a pair of straps, which normally hang from the roof on the interior of the vehicle, prior to the use of the device.

1 Claim, 4 Drawing Figures

U.S. Patent  Jan. 7, 1986  4,563,023
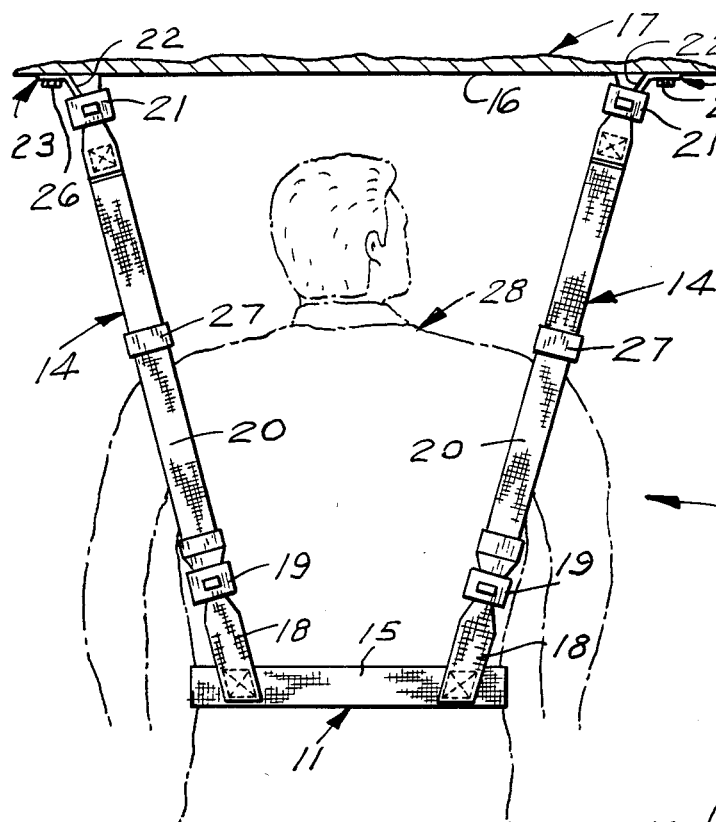
FIG.1
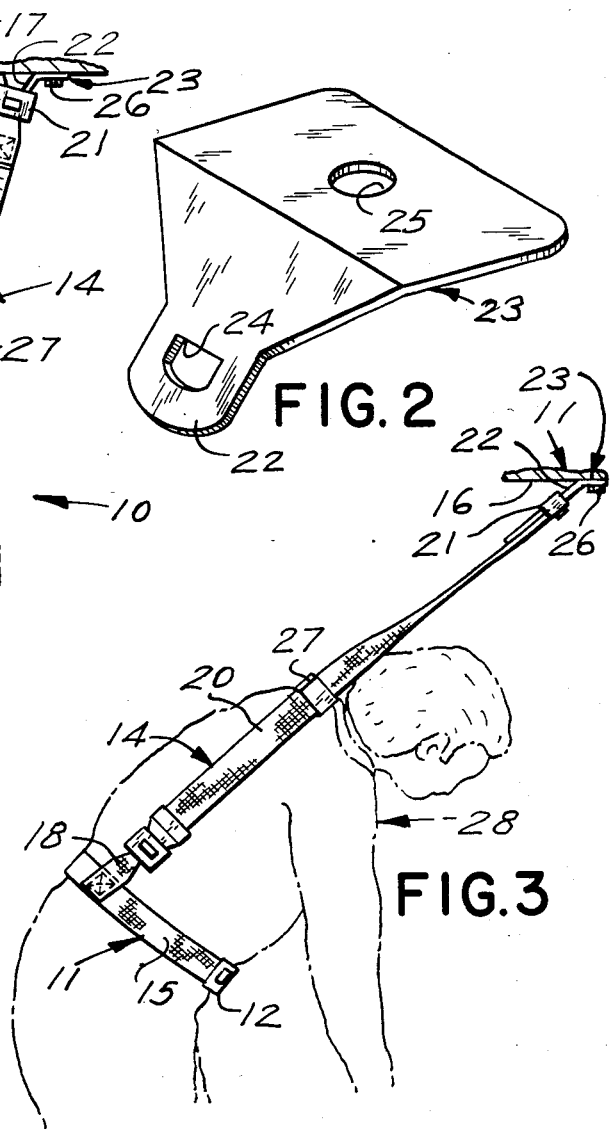
FIG.2
FIG.3
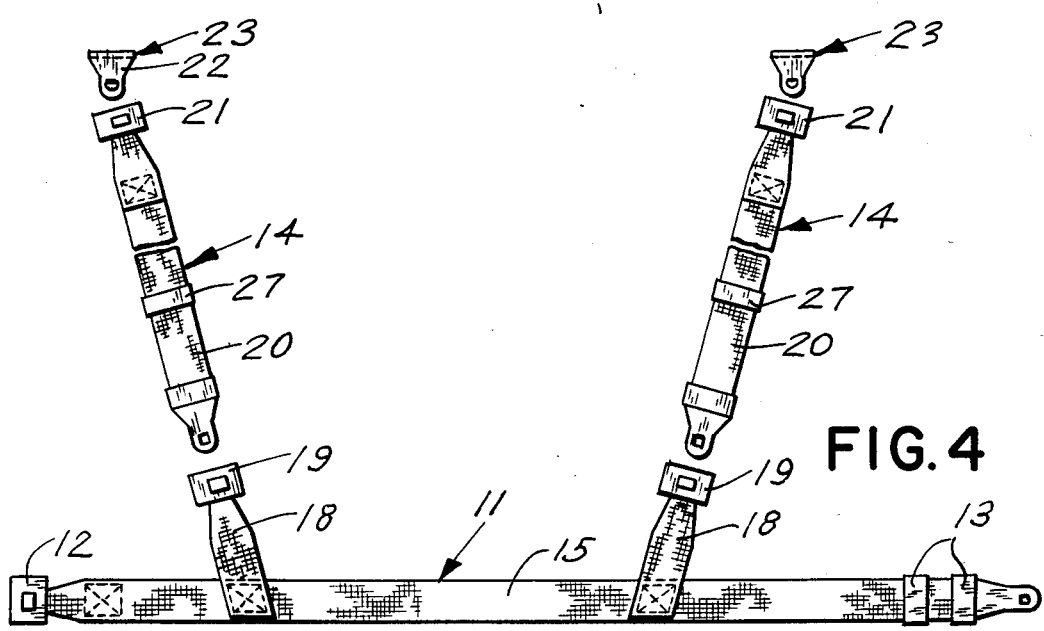
FIG.4

AMBULANCE SAFETY STABILIZER HARNESS FOR PARA-MEDICS

This invention relates to devices for automotive vehicles, and more particularly, to an ambulance safety stabilizer harness for para-medics.

The principal object of this invention is to provide an ambulance safety harness for para-medics, which will be unique, in that it will serve as a most needed piece of equipment for ambulance employment, so as to aid emergency medical technicians, who are more commonly referred to by laymen as para-medics.

Another object of this invention is to provide an ambulance safety stabilizer harness for para-medics, which will be of such design, as to effect the long needed and safe support of an EMT-A or para-medic, while he is providing medical assistance to a patient enroute to a medical facility, such as a hospital. During the performance of cardio-pulmonary resuscitation, at present, an extra person must be taken along, or the para-medic must hold on to or have someone hold onto him while trying to perform any medical task while the ambulance is in motion. This medical assistance is currently performed. However, it is done so without due regard for the safety of the para-medic.

Another object of this invention is to provide an ambulance safety stabilizer harness for para-medics, which will be of such design, as to enable the para-medic to have both hands free to provide the care to a patient that is needed. After all, the better care a patient is given, the better chance he will have, and it is known that, from time to time, a squadsman or para-medic has suffered injury from a fall while the emergency vehicle was in motion. This would not have happened if the present invention was available for use.

A further object of this invention is to provide an ambulance safety stabilizer harness, which will include an adjustable belt, that will be fastened around the waist of the para-medic, and stabilizer straps will be attached thereto, and to roof latch receiver mounts, where they may be adjusted, so as to enable them to depend downward and out of the way, when the patient is being placed in the emergency vehicle.

A still further object of this invention is to provide an ambulance safety stabilizer harness, which will further include quick-release buckles on each side of the belt and straps, for fast attachment and release, and the harness will be fabricated to conform to motor vehicle safety standards.

Other objects are to provide an ambulance safety stabilizer harness which is simple in design, inexpensive to manufacture, rugged in construction, easy to use, and efficient in operation.

These, and other objects, will be readily evident, upon a study of the following specification, and the accompanying drawing, wherein:

FIG. 1 is a rear view of the present invention, shown secured to the roof of an emergency vehicle, shown in elevation, and a para-medic is illustrated fragmentary and in phantom lines;

FIG. 2 is an enlarged perspective view of one of the latch receiver mounts, shown removed therefrom;

FIG. 3 is a side view of FIG. 1, showing the invention supporting the para-medic performing his duties, and FIG. 4 is a partially exploded rear elevational view of the invention, shown removed from the vehicle and the para-medic.

Accordingly, a harness 10 is shown to include a nylon web belt 11, having a quick-release buckle 12, which is suitably stitched to one end of belt 11. Buckle 12 is common in manufacture, and a pair of elastic loops 13 are received on belt 11, and the opposite end of belt 11 is adjustably received in buckle 12, in the manner known in the art. A pair of adjustable support straps 14 are provided, and each is fixedly secured, by stitching, to the rear face 15 of belt 11, and are angularly disposed of each other and spaced-apart, for attachment to the roof 16 of the ambulance 17 or other vehicle. Straps 14 are also fabricated of nylon webbing material, and include a short portion 18, which is stitched at one end to the rear face 15 of belt 11. The opposite end of short portion 18 is fixedly secured, by stitching, to a quick-release buckle 19, similar to the abovedescribed buckle 12, and buckle 19 receives one end of the long portion 20 of its respective strap 14. The opposite ends of long portions 20 of straps 14 also include a quick-release buckle 21, for being latched to the tongue 22 of a latch receiver 23, and an opening 24 is included through tongue 22 for the reception of the common buckle 21. An opening 25 is also included through latch receiver 23, which receives a suitable bolt fastener 26, that securely fastens harness 10 to the roof 16 of ambulance 17. An elastic loop 27 is received on long portion 20 of straps 14, and in conjunction with loops 13, serves as a means for adjusting harness 10, in the manner known in art, and they also serve to elevate harness 10 out of the way in the ambulance, when it is not in use.

In use, belt 11 is placed around the waist of the para-medic 28, and fastened with buckle 12, after which, it is adjusted in the normal manner, the abovementioned being performed while that vehicle is enroute to the scene where the patient is. The stabilizer straps 14 are then attached to the belt 11 at the short portions 18, by means of buckles 19 thereof, and it shall be noted, that the straps 14 are already fastened to the roof 16 of ambulance 17, and straps 14 are then adjusted as to length, in the manner known in the art.

While various changes may be made in the detail construction, it is understood that such changes will be within the spirit and scope of the present invention, as is defined by the appended claims.

I claim:

1. An ambulance safety stabilizer harness for para-medics, comprising, in combination, a nylon web belt, a quick release buckle on one end of said belt for adjustably receiving an opposite end of said belt; a pair of elastic loops received on said belt; a pair of adjustable support strap assemblies each of which comprises a short strap and a long strap, one end of each said short strap being fixedly stitched to a rear face of said belt and along spaced apart locations of said belt, said short straps extending angularly therefrom in diverging directions, a quick release buckle on an opposite end of each said short strap receiving one end of said long strap, an elastic loop received on said long strap and a common buckle on an opposite end of said long strap, and both said short and long straps being made of nylon webbing; and a pair of latch receivers for being mounted on an underside of a vehicle roof, each said latch receiver comprising a flat plate having a single mounting opening receiving a bolt fastener secured to said roof, and an angularly extending tongue formed on one edge of said plate being received in said common buckle of said long strap.

* * * * *